United States Patent
Han et al.

(10) Patent No.: US 7,382,577 B2
(45) Date of Patent: Jun. 3, 2008

(54) MAGNETIC WRITE HEAD HAVING A WIDER TRAILING EDGE POLE STRUCTURE

(75) Inventors: Cherng-Chyi Han, San Jose, CA (US); Mao-Min Chen, San Jose, CA (US); Po Kang Wang, San Jose, CA (US); Fenglin Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 233 days.

(21) Appl. No.: 11/229,160

(22) Filed: Sep. 16, 2005

(65) Prior Publication Data

US 2006/0012915 A1   Jan. 19, 2006

Related U.S. Application Data

(62) Division of application No. 10/394,098, filed on Mar. 21, 2003, now Pat. No. 6,960,281.

(51) Int. Cl.
*G11B 5/39*   (2006.01)
*G11B 5/187*   (2006.01)

(52) U.S. Cl. ............... 360/125.46; 360/125.48; 360/125.59

(58) Field of Classification Search ........... 360/126, 360/122
See application file for complete search history.

(56) References Cited

U.S. PATENT DOCUMENTS

| | | | |
|---|---|---|---|
| 4,970,616 A * | 11/1990 | Ramaswamy | ............... 360/122 |
| 5,578,342 A | 11/1996 | Tran et al. | ............... 427/131 |
| 5,901,432 A | 5/1999 | Armstrong et al. | ....... 29/603.14 |
| 5,966,277 A * | 10/1999 | Koshikawa et al. | ... 360/125.66 |
| 6,199,267 B1 | 3/2001 | Koshikawa et al. | ..... 29/603.15 |
| 6,243,939 B1 | 6/2001 | Chen et al. | .............. 29/603.14 |
| 6,477,002 B1 * | 11/2002 | Mizoh | .................. 360/125.66 |
| 6,480,355 B1 * | 11/2002 | Kamijima | .............. 360/125.65 |
| 6,504,675 B1 * | 1/2003 | Shukh et al. | .......... 360/125.12 |
| 6,614,621 B2 * | 9/2003 | Kakehi et al. | ......... 360/125.51 |

(Continued)

FOREIGN PATENT DOCUMENTS

| | | | |
|---|---|---|---|
| JP | 2001014610 A | * | 1/2001 |
| JP | 2001-160207 | | 6/2001 |
| JP | 2002-197616 | | 7/2002 |
| JP | 2002-217029 | | 8/2002 |
| JP | 2002-280217 | | 9/2002 |
| JP | 2003-006813 | | 1/2003 |

*Primary Examiner*—Brian E. Miller
(74) *Attorney, Agent, or Firm*—Saile Ackerman LLC; Stephen B. Ackerman

(57) ABSTRACT

A trimmed upper pole piece for a magnetic write head, said pole piece having a tapered profile that is widest at its trailing edge. Such a pole piece is capable of writing narrow tracks with sharply and well defined patterns and minimal overwriting of adjacent tracks. The necessary taper is produced by using NiCr, NiFeCr, Rh or Ru as write gap filling materials which have an etch rate which is substantially equal to the etch rate of the other layers forming the pole piece and are highly corrosion resistant. As a result, the write gap does not protrude to mask the effects of the ion-beam etch used to form the taper.

7 Claims, 2 Drawing Sheets

U.S. PATENT DOCUMENTS

| | | | |
|---|---|---|---|
| 6,731,460 B2 * | 5/2004 | Sasaki | 360/125.56 |
| 6,738,223 B2 * | 5/2004 | Sato et al. | 360/125.53 |
| 6,887,355 B2 | 5/2005 | Han et al. | 204/192.34 |
| 7,251,103 B2 * | 7/2007 | Hsiao et al. | 360/126 |
| 2002/0015266 A1 * | 2/2002 | Han et al. | 360/317 |
| 2002/0181162 A1 * | 12/2002 | Chen et al. | 360/317 |
| 2004/0027729 A1 * | 2/2004 | Lo et al. | 360/317 |
| 2005/0024771 A1 * | 2/2005 | Le | 360/126 |
| 2005/0036237 A1 * | 2/2005 | Yazawa et al. | 360/126 |
| 2006/0288565 A1 * | 12/2006 | Le et al. | 29/603.12 |

* cited by examiner

MAGNETIC WRITE HEAD HAVING A WIDER TRAILING EDGE POLE STRUCTURE

This is a division of patent application serial number 10/394,098, filing date Mar. 21, 2003, now U.S. Pat. No. 6,960,281. A Method To Make A Wider Trailing Pole Structure By Self-Aligned Pole Trim Process, assigned to the same assignee as the present invention, which is herein incorporated by reference in its entirety.

BACKGROUND OF THE INVENTION

1. Field of the Invention

This invention relates to thin film magnetic write head fabrication in general and, more specifically, to a method of improving the magnetization pattern of such a write head by forming it with a wider trailing pole than leading pole.

2. Description of the Related Art

Thin film magnetic write heads are used to encode magnetically stored information on moving magnetic media such as tapes and discs. In the simplest terms, such a head consists of two pole pieces separated at the air-bearing surface (ABS) by a narrow gap (the write gap) and yoked together behind the ABS to form an approximately horseshoe-shaped assembly. A conductive coil is patterned between the pole pieces which, when electrically energized, induces a magnetic field between the poles which fringes across the gap. It is this induced field that encodes small magnetic regions in the moving medium.

The rapid changes in the state of the art have necessitated continual improvements in the area density of information that can be magnetically encoded and decoded in the moving medium. For a disk, this area density is a product of the number of recording tracks per mm measured radially, and the number of flux reversals per mm along the track, measured tangentially. With the development of the extremely sensitive magneto-resistive read heads, methods for improving the area density are now focussing on extending the limits of the inductive writing technology.

There are several approaches to improving the writing technology, one of which is to narrow track widths and thereby increase the number of tracks per mm. As the tracks become narrower, however, it is increasingly necessary that the magnetization pattern on the track be sharply bounded and well defined. This not only insures maximum readability of each track, but it also reduces the interference between adjacent tracks. This approach requires that the writing tip of the magnetic pole assembly, including its write gap, be made as narrow as possible. In addition, the fringing fields extending beyond the width of the write gap should be minimized so that writing does not also occur on portions of the recording media away from the selected track. In the prior art, such fringe field minimization has generally been attained by forming the write gap within a narrow, symmetric pole piece. One way of forming such narrow, symmetric pole pieces and write gaps is to first form them with a relatively wide shape and then trim the shape to the desired width by means of an etching process, which, typically is a series of ion-beam etches (IBE) or milling process. These etching processes are time consuming and lead to undesirable width discontinuities between various portions of the pole piece. Such a prior art method of producing a symmetric, trimmed upper pole piece is taught by Chen et al. (U.S. Pat. No. 6,243,939).

Armstrong et al. (U.S. Pat. No. 5,901,432) teach a method of trimming a pole piece wherein the WG layer of nickel phosphorus is initially formed to the correct thickness by electroplating it within a photoresist form. Thus, the ion-beam milling is not required to remove any of the WG layer since it is already of the correct dimensions.

Koshikawa et al. (U.S. Pat. No. 6,199,267) teach a method of forming a magnetic write head with an ion-beam trimmed pole piece, in which unwanted side-effects of the ion-beam are eliminated by forming depressions to either side of the pole piece and filling them with non-magnetic material.

Tran et al. (U.S. Pat. No. 5,578,342) teach a method of forming a write head whose leading and trailing pole pieces have substantially the same width and whose edges are aligned. The purpose of this width uniformity is to eliminate data transitions that are written wider by the trailing pole (trailing relative to the motion of the medium being written on) than by the leading pole, thus leading to poorly defined track edges ("transition curvature").

The present invention was motivated by the realization that a track magnetization pattern can be improved by forming the write head with a slightly wider trailing pole than leading pole. The prior art cited above does not address the advantages of such a write head or teach a method of pole trimming that would be suitable for forming it. In a related patent application, Ser. No. 10/284,848, filing date Oct. 31, 2002, now issued as U.S. Pat. No. 6,887,355, fully incorporated herein by reference, a pole trimming method is taught that allows the efficient formation of a write head having leading and trailing poles of equal and uniform width. That method can now be used to form a write head in which the leading pole edge is narrower than the trailing pole edge.

SUMMARY OF THE INVENTION

A first object of this invention is to provide a write head having improved performance at high track density.

A second object of this invention is to provide a write head that minimizes transition curvature at track edges.

A third object of this invention is to provide a method for forming such a write head that is practical and efficient.

The objects of this invention will be realized by a self-aligned method of trimming a write head pole structure so that the trailing pole edge is slightly wider than the leading pole edge and the pole, thereby, has a slightly tapered (retrograde) profile. This method utilized ion-beam etching (IBE) to produce the required trimming and a write gap layer made of material having an etch rate that is comparable to that of the pole material. The use of such gap material is an essential part of the invention, because it eliminates a problem wherein the gap layer protrudes and acts as a shadow mask that prevents the IBE from adequately trimming the portion of the pole piece that is beneath the gap layer (the leading portion of the pole). Thus, the IBE can be easily aligned along the sides of the pole formation to produce a uniform taper.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention is a method of forming and trimming an upper pole piece of a magnetic write head such that the piece so formed has a trailing edge that is slightly wider than its leading edge.

A description of the preferred embodiment will be given in the context of the schematic drawings designated as FIGS. 1a-1f.

Figure 1A:
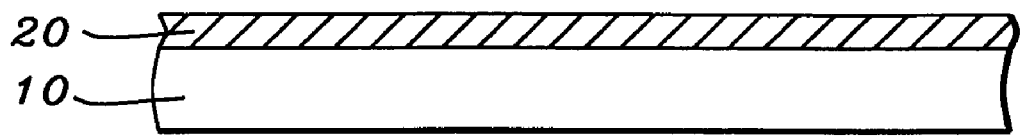
FIGS. 1a-1f show a series of schematic air bearing surface (ABS) views of the formation and trimming of an upper pole piece using the method of the invention.

Referring first to FIG. 1a, we have as a starting point for the fabrication of the pole piece a shield layer (10) on which has been formed a write gap layer (20). The shield layer is typically a layer of magnetic material such as CoFeNi. In accord with the method to be practiced herein, the write gap layer is formed of a non-magnetic, corrosion resistant, gap-filling material whose IBE rate is substantially the same as the IBE rate of both the shield layer material and the materials of the seed layer and plated pole portion which, together, will form the upper pole piece above the gap layer. For an IBE using Ar ions at a voltage of approximately 700 volts and a current of approximately 800 mA, gap-filling materials that satisfy the equal etch-rate criterion include NiCr, with a 40% atomic percentage of Cr, NiFeCr, Rh and Ru. For etching angles of 30°, 60° and 65° respectively, the etch rate ratios of NiCr/CoNiFe are 1.071, 1.18 and 1.052, while the etch rate ratios of Ru/CoNiFe are 1.018, 0.925 and 0.852. The NiCr is preferably formed to a thickness between approximately 500 and 1500 angstroms. In addition, all the materials above are highly corrosion resistant.

Figure 1B:
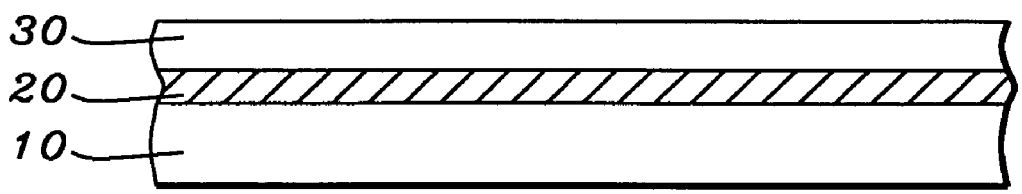

Referring next to FIG. 1b, there is shown the formation of FIG. 1a wherein a seed layer (30) has been formed on the write gap layer to enhance the plating process of the upper pole piece. The seed layer is preferably a layer of CoFeN formed to a thickness between approximately 1000 and 3000 angstroms.

Figure 1C:
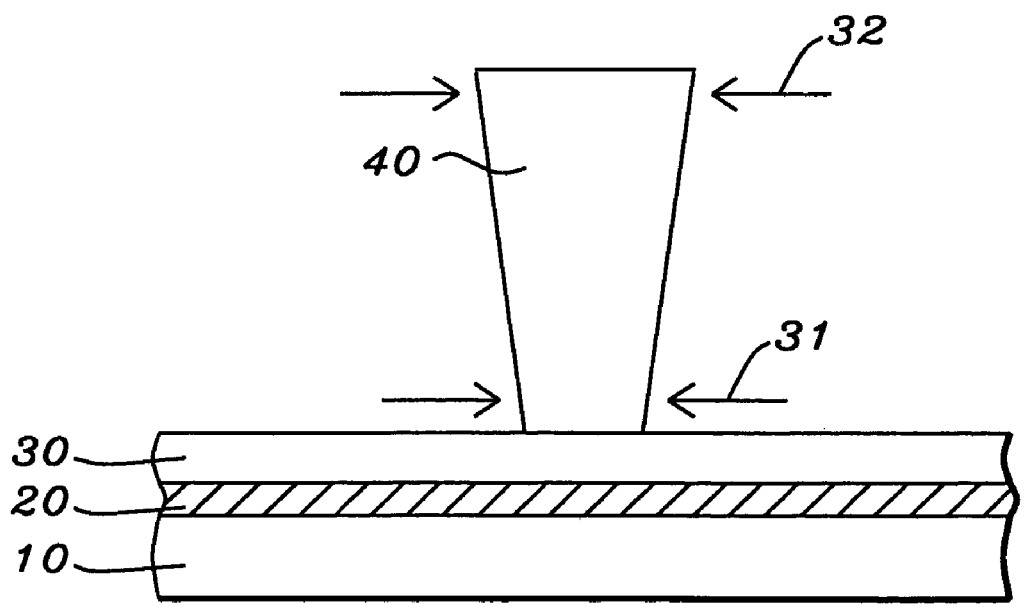

Referring next to FIG. 1c, there is shown the formation of FIG. 1b wherein a monolithic plated pole portion (40) has been plated onto the seed layer (30). The pole piece is preferably a layer of CoNiFe plated to a thickness (height) of between approximately 35,000 and 40,000 angstroms. The pole piece is formed (by plating in a tapered form) with an initial tapered profile and tapers uniformly from its minimum width, $W_1$ (arrow (31)) at its leading edge, which is between approximately 0.20 and 0.40 microns, to its maximum width, $W_2$ (arrow (32)) which is between approximately 0.45 and 0.65 microns. The terms "leading" and "trailing," as used in this application refer, respectively, to the portions of the pole piece that initially and finally pass over the portion of the magnetic medium on which a given datum is written. In short, the medium moves into the leading edge and away from the trailing edge. In this embodiment, the leading edge of the pole piece is in contact with the gap layer.

Figure 1D:
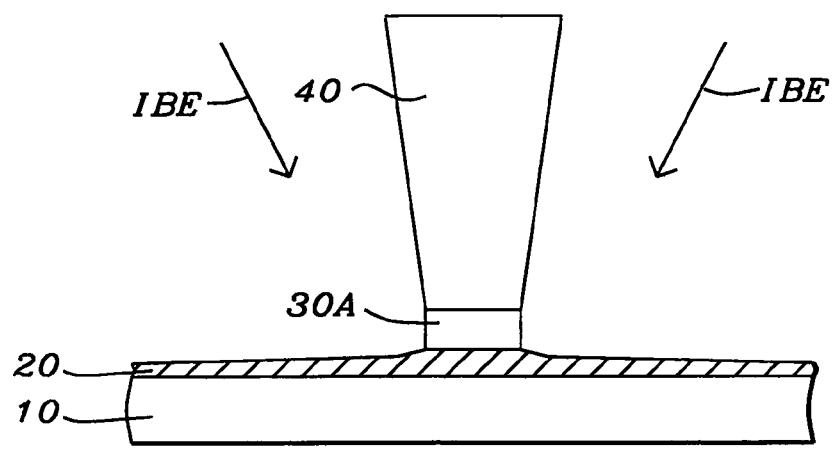

Referring next to FIG. 1d, there is shown the formation of FIG. 1c wherein an ion-beam etch (IBE) at an angle between approximately 30° and 40° (shown schematically by arrows) has been used to remove the seed layer with the exception of a portion (30A) beneath the plated pole portion. The IBE has also removed portions of the write gap layer, leaving the remaining portion (20A) with the approximate taper as the pole piece as schematically shown.

Figure 1E:
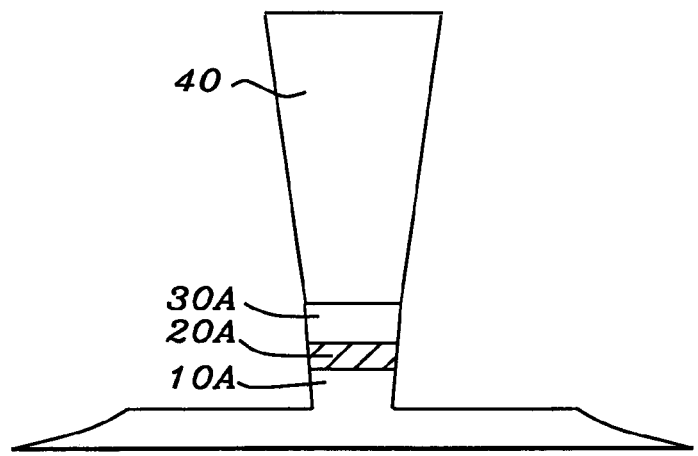

Referring next to FIG. 1e, there is shown the formation of FIG. 1d wherein a further IBE (similar to that shown in FIG. 1d and not indicated) has removed portions of the shield layer and write gap layer leaving a pedestal (also referred to as a "notch") in the shield layer (10A) beneath the plated pole portion and a remaining portion of the write gap layer (20A) situated between the shield layer pedestal and the seed layer (30A). The pedestal is between approximately 0.25 and 0.40 microns in height.

Figure 1F:
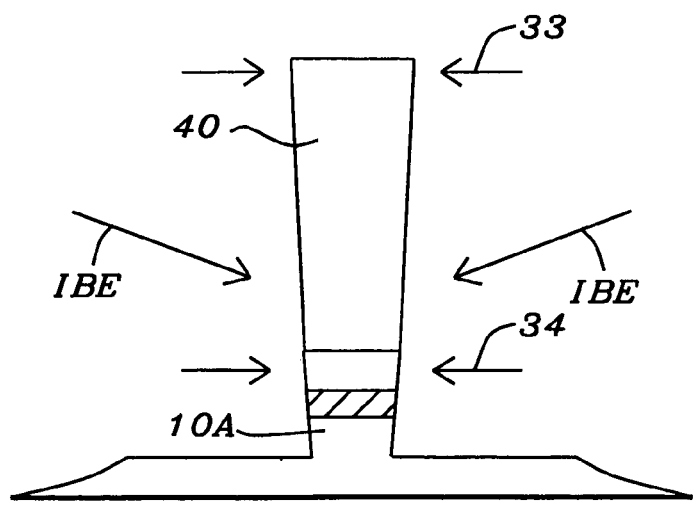

Referring finally to FIG. 1f, there is shown the formation of FIG. 1e now being trimmed to its final critical dimension (CD), wherein the width of the pole piece ranges from between approximately 0.30 and 0.40 microns at its maximum width, $W_3$ (arrow (33)) and between approximately 0.15 and 0.25 microns at its minimum width, $W_4$ (arrow (34)). The final trimming is accomplished by a high angle IBE, indicated schematically and approximately by arrows as in the previous figures.

As is understood by a person skilled in the art, the preferred embodiment and examples of the present invention are illustrative of the present invention rather than limiting of it. Revisions and modifications may be made to processes, structures and dimensions through which is formed a trimmed upper pole piece of tapered profile and wider at its trailing edge than its leading edge, in accord with the preferred embodiment of the present invention while still providing such a trimmed upper pole piece of tapered profile and wider at its trailing edge than its leading edge in accord with the present invention and appended claims.

What is claimed is:

1. A trimmed upper pole piece for a magnetic write head having a tapered profile and being wider at its trailing edge than at its leading edge, comprising:
    a laterally extensive shield layer having a narrow pedestal formed integral thereto and projecting vertically therefrom;
    a write gap layer formed on said narrow pedestal;
    a seed layer formed on said write gap layer;
    a plated pole portion formed on said seed layer to a thickness between approximately 3.5 and 4 microns, whereby said plated pole portion and said seed layer form a tapered upper pole piece , and;
    said shield layer, said write gap layer, said seed layer and said plated pole portion being formed of materials having substantially equal ion-beam etch rates, and;
    said write gap layer, said seed layer and said plated pole portion being tapered from a minimum width where said gap layer contacts said pedestal, to a maximum width at the trailing edge of said plated pole portion.

2. The upper pole piece of claim 1 wherein the write gap layer is formed of NiCr of 40% Cr by atomic composition.

3. The upper pole piece of claim 1 wherein the write gap layer is a layer of Ru formed to a thickness between approximately 500 and 1500 angstroms.

4. The upper pole piece of claim 1 wherein the write gap layer is a layer of NiFeCr formed to a thickness between approximately 500 and 1500 angstroms.

5. The upper pole piece of claim 1 wherein the write gap layer is a layer of Rh formed to a thickness between approximately 500 and 1500 angstroms.

6. The upper pole piece of claim 1 wherein the plated pole portion is CoNiFe formed to a thickness between approximately 35,000 and 30,000 angstroms.

7. The upper pole piece of claim 1 wherein the tapered profile is between approximately 0.30 and 0.40 microns at its maximum width and between approximately 0.15 and 0.25 microns at its minimum width.

* * * * *